(12) United States Patent
Harashina

(10) Patent No.: US 11,772,389 B2
(45) Date of Patent: Oct. 3, 2023

(54) PRINTER DEVICE

(71) Applicant: TOSHIBA TEC KABUSHIKI KAISHA, Tokyo (JP)

(72) Inventor: Hiromasa Harashina, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 17/333,044

(22) Filed: May 28, 2021

(65) Prior Publication Data

US 2022/0088942 A1 Mar. 24, 2022

(30) Foreign Application Priority Data

Sep. 24, 2020 (JP) ................................. 2020-160041

(51) Int. Cl.
| | | |
|---|---|---|
| *B41J 3/01* | (2006.01) | |
| *B41J 2/32* | (2006.01) | |
| *G06F 1/3203* | (2019.01) | |
| *B41J 29/38* | (2006.01) | |
| *B41J 11/04* | (2006.01) | |

(52) U.S. Cl.
CPC . *B41J 3/01* (2013.01); *B41J 2/32* (2013.01); *B41J 11/04* (2013.01); *B41J 29/38* (2013.01); *G06F 1/3203* (2013.01)

(58) Field of Classification Search
CPC ...... B41J 25/304; B41J 25/312; B41J 25/316; B41J 2/32; B41J 25/308; B41J 25/3082; B41J 25/3084; B41J 25/3086; B41J 25/3088; B41J 3/01; B41J 2/36; B41J 11/04; B41J 29/38; G06F 1/3203
See application file for complete search history.

(56) References Cited

U.S. PATENT DOCUMENTS

| | | | | |
|---|---|---|---|---|
| 6,788,326 | B2 * | 9/2004 | Sasaki | .................... B41J 25/312 |
| | | | | 347/198 |
| 2015/0009257 | A1 * | 1/2015 | Endo | ........................ B41J 11/46 |
| | | | | 347/16 |

FOREIGN PATENT DOCUMENTS

JP 1-281968 11/1989

* cited by examiner

*Primary Examiner* — Kristal Feggins
(74) *Attorney, Agent, or Firm* — AMIN, TUROCY & WATSON, LLP

(57) ABSTRACT

According to one embodiment, in a barcode printer (printer device), if a sleep mode transition detection unit (first state transition detection unit) detects that a barcode printer transitions to a sleep mode (first state), or if a power state control unit detects an instruction to turn off the power of the barcode printer, a head position control unit pulls the thermal head (print head) away from the platen roller and holds the thermal head in the state of being pulled away from the platen roller.

13 Claims, 6 Drawing Sheets

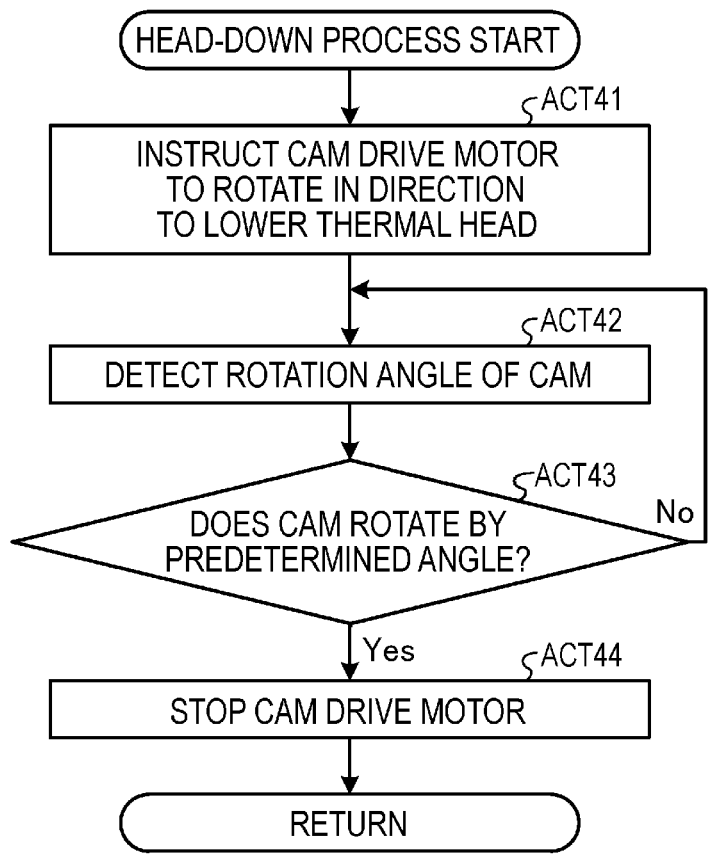

PRINTER DEVICE

CROSS-REFERENCE TO RELATED APPLICATION

This application is based upon and claims the benefit of priority from Japanese Patent Application No. 2020-160041, filed on Sep. 24, 2020, the entire contents of which are incorporated herein by reference.

FIELD

Embodiments described herein relate generally to a printer device.

BACKGROUND

In the related art, there is known a printer device that separates the thermal head and the platen roller to release the state in which the label sheet is sandwiched between the thermal head and the platen roller by performing a so-called head-up operation in which the thermal head is held in a raised state, in order to prevent deformation of the platen roller and damage to the label sheet due to being pressed by the head if the label is not printed for a long time (.

However, in such a printer device, the operator gives an instruction to raise the thermal head by a switch or the like. Therefore, there is a problem that the operation may be forgotten.

DESCRIPTION OF THE DRAWINGS

FIG. 8 is a flowchart showing an example of the flow of the head-down process performed by the barcode printer.

DETAILED DESCRIPTION

One aspect of the present disclosure is to provide a printer device capable of reliably performing a head-up operation.

In general, according to one embodiment, the printer device includes a first state transition detection unit and a head position control unit. The first state transition detection unit detects that the printer device transitions to a first state. The head position control unit pulls the print head away from the platen roller and holds the state in which the print head is pulled away from the platen roller on condition that the first state transition detection unit detects that the printer device transitions to the first state.

Embodiment

A barcode printer 10 according to the embodiment of the present invention will be described. The barcode printer 10 prints a predetermined barcode on a label sheet 32 by a thermal head 11 while conveying the label sheet 32 wound around a sheet roll 31. The barcode printer 10 is an example of the printer device in the present disclosure. Further, although the present embodiment describes the barcode printer 10, the scope of application of the present disclosure is not limited to the barcode printer 10 and can be applied to a general printer device such as a thermal printer or portable printer.

(Schematic Configuration of Barcode Printer)

Figure 1:
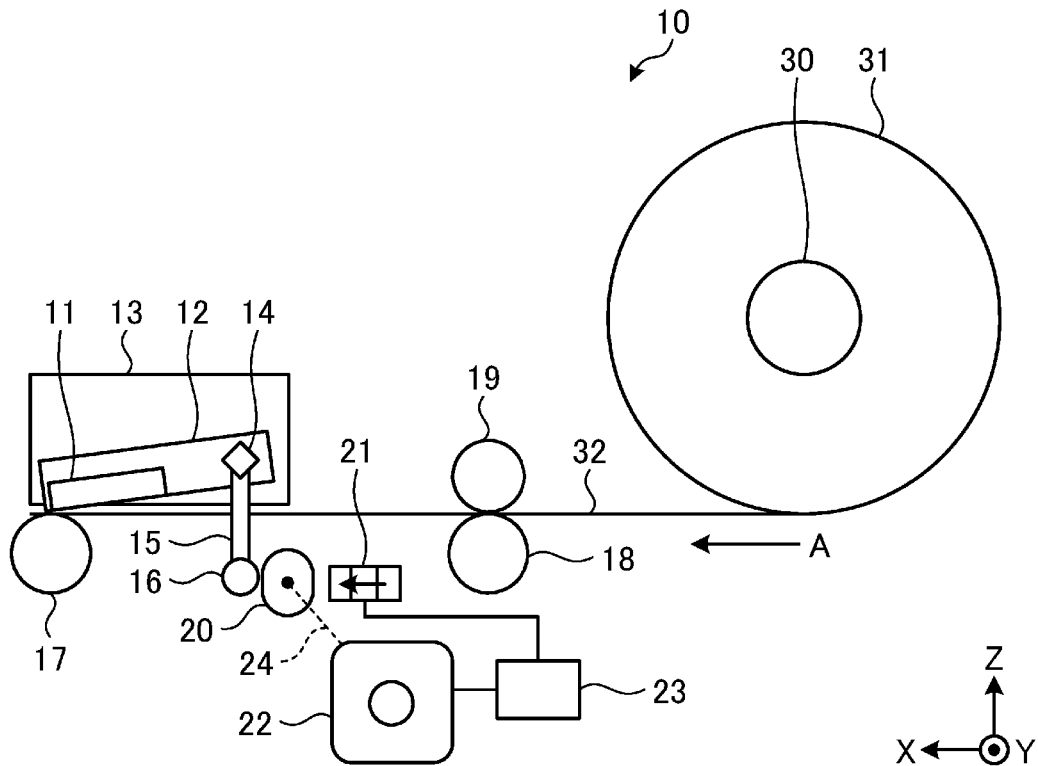
FIG. 1 is a schematic diagram showing an example of a schematic configuration of a barcode printer according to an embodiment.

First, the schematic configuration of the barcode printer 10 will be described with reference to FIG. 1. FIG. 1 is a schematic diagram showing an example of the schematic configuration of the barcode printer according to the embodiment.

The barcode printer 10 includes a head block 13, a platen roller 17, a conveyance roller 18, a pinch roller 19, a cam 20, a head position detection sensor 21, a cam drive motor 22, a head position control unit 23, and the sheet roll 31.

The barcode printer 10 draws out the label sheet 32 from the sheet roll 31 wound in a roll shape and prints a predetermined barcode on the label sheet 32 by the thermal head 11 included in the head block 13 while conveying the label sheet 32 along a conveying direction A. The label sheet 32 is a heat-sensitive paper having a layer of a heat-sensitive color-developing agent on the printing surface.

The barcode printer 10 conveys the label sheet 32 sandwiched between the platen roller 17 and the thermal head 11 in the conveying direction A by the rotational driving force of the platen roller 17 which is rotationally driven by a platen motor (not shown).

The barcode printer 10 includes the conveyance roller 18, the pinch roller 19, the platen roller 17, and the thermal head 11 in this order from the upstream side in the conveying direction A along the conveyance path of the label sheet 32.

The conveyance roller 18 comes into contact with the pinch roller 19 while sandwiching the label sheet 32, rotates along with the movement of the label sheet 32, and guides the label sheet 32 to the conveyance path.

The thermal head 11 is connected to a thermal head driver (not shown). The thermal head driver controls the temperature of a plurality of heat-generating elements included in the thermal head 11. The thermal head 11 whose temperature is controlled by the thermal head driver prints a predetermined barcode on the label sheet 32 by abutting on the label sheet 32. The thermal head 11 is an example of the print head in the present disclosure.

The thermal head 11 is stored in the head block 13 in a state of being attached to a thermal head mounting member 12. The thermal head 11 is biased against the platen roller 17 by an elastic member. The thermal head 11 biased by the elastic member presses the label sheet 32 conveyed between the thermal head 11 and the platen roller 17 against the platen roller 17.

The thermal head 11 includes a plurality of heat-generating elements arranged in a row and causes the heat-generating elements to generate heat by selectively energizing the plurality of heat-generating elements. Then, if the heat-generated thermal head 11 comes into contact with the label sheet 32, printing is performed on the label sheet 32, which is a thermal paper. The generated heat temperature of the heat-generating element is approximately 65 to 90° C. This temperature is adjusted to the color development temperature of the label sheet 32.

An ink ribbon may be inserted between the thermal head 11 and the label sheet 32 and the heat generated by the heat-generating element of the thermal head 11 may melt or sublimate the ink on the ink ribbon to transfer the ink to the label sheet 32 and perform printing. In this case, the label sheet 32 does not have to be thermal paper.

The platen roller 17 is arranged to face the thermal head 11 and is rotationally driven by a rotational drive mechanism including a motor (not shown) such as a stepping motor, a gear, and a belt. The platen roller 17 conveys the label sheet 32 supplied from the sheet roll 31 along the conveyance path while sandwiching the label sheet 32 between the thermal head 11 and the platen roller 17.

The head block 13 includes the thermal head 11 and the thermal head mounting member 12 therein. The head block 13 is rotatably supported around the Y axis by a shaft-shaped head block support member 14 arranged along the Y axis.

A link member 15 is further rotatably attached to the head block support member 14. The link member 15 is fixed to the head block 13 and the head block 13 and the head block support member 14 rotate integrally around the Y axis with the head block support member 14 as an axis. A roller 16 is installed at the end of the link member 15 on the opposite side of the head block support member 14.

The roller 16 is arranged in contact with the cam 20 and is biased against the cam 20 by a biasing unit (not shown). Then, the roller 16 moves in the X-axis direction by an amount corresponding to the rotation angle of the cam 20.

The cam 20 has a substantially elliptical shape and rotates around the Y axis in accordance with the rotation of the cam drive motor 22. The rotational force of the cam drive motor 22 is transmitted to the cam 20 by, for example, a belt 24.

The cam drive motor 22 rotates in the direction according to the instruction from the head position control unit 23.

The head position detection sensor 21 detects the rotation angle of the cam 20. The specific configuration of the head position detection sensor 21 will be described later.

The head position control unit 23 determines whether the barcode printer 10 is in a state where it is necessary to perform a so-called head-up operation in which the thermal head 11 is separated from the platen roller 17 and held in a separated state, or in a state where it is necessary to perform a so-called head-down operation in which the headed-up thermal head 11 is brought into contact with the platen roller 17. Then, the head position control unit 23 gives an instruction of the rotation direction and the rotation start to the cam drive motor 22. Further, the head position control unit 23 receives the rotation angle of the cam 20 detected by the head position detection sensor 21. Then, the head position control unit 23 stops the rotation of the cam drive motor 22 if the cam 20 rotated by a predetermined angle after the cam 20 started rotating.

The printed label sheet 32 is discharged from a discharge port (not shown). A cutter may be installed at the discharge port to cut the printed label sheet 32 into a predetermined size.

(Head-Up Operation of Barcode Printer)

Figure 2:
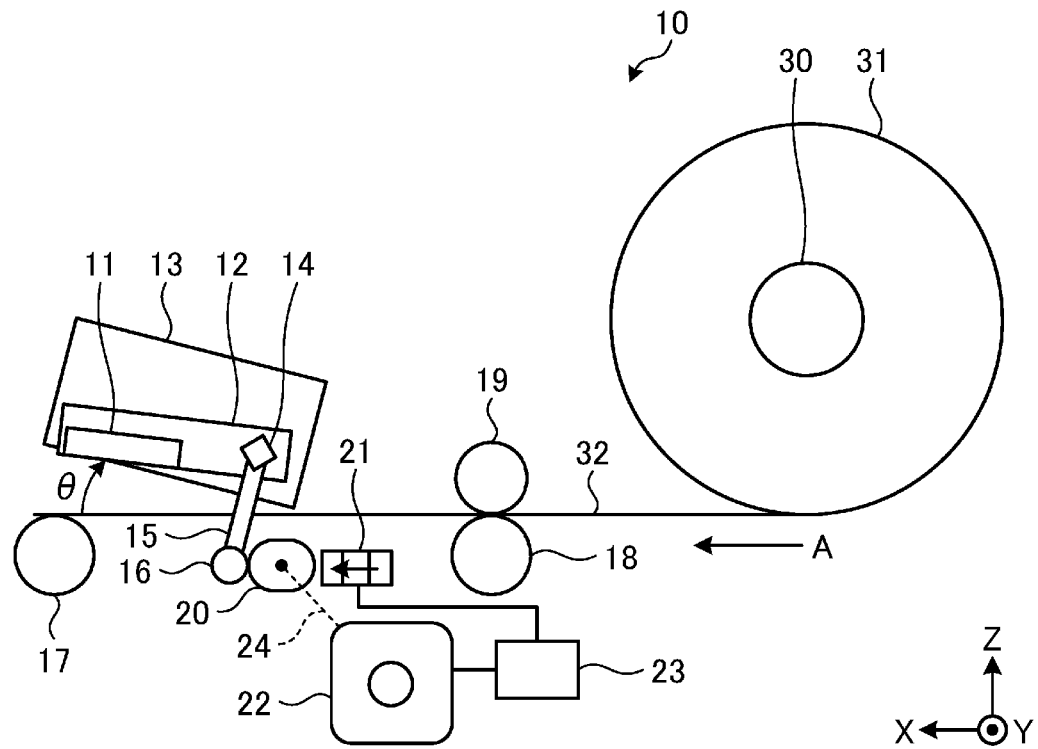
FIG. 2 is a schematic diagram showing an example of a state in which the barcode printer of FIG. 1 is headed up.

Next, the head-up operation performed by the barcode printer 10 will be described with reference to FIG. 2. FIG. 2 is a schematic diagram showing an example of the state in which the barcode printer of FIG. 1 is headed up.

When the barcode printer 10 is in the state shown in FIG. 1, if the head position control unit 23 of the barcode printer 10 determines that the thermal head 11 needs to be headed up, the head position control unit 23 instructs the cam drive motor 22 to rotate, for example, clockwise.

The rotation of the cam drive motor 22 is transmitted to the cam 20 via the belt 24. Then, the cam 20 rotates clockwise.

The roller 16 moves to the positive side in the X-axis direction by an amount corresponding to the rotation angle of the cam 20. Then, the roller 16 rotates the link member 15 clockwise around the head block support member 14 by an amount corresponding to the rotation angle of the cam 20.

Since the link member 15 is fixed to the head block 13, the head block 13 rotates clockwise around the head block support member 14 as the link member 15 rotates. As a result, the head block 13 rotates clockwise by an angle θ, and thus, the thermal head 11 is separated from the platen roller 17 (head-up operation).

Further, if the cam 20 rotates in the opposite direction (counterclockwise) or further rotates clockwise, the roller 16 moves to the negative side in the X-axis direction by an amount corresponding to the rotation angle of the cam 20. Then, as the roller 16 moves to the negative side in the X-axis direction, the head block 13 rotates counterclockwise around the head block support member 14. As a result, the head block 13 rotates counterclockwise by an angle θ, and thus, the thermal head 11 comes into contact with the platen roller 17 (head-down operation).

The timing at which the head position control unit 23 determines that the thermal head 11 needs to be headed up may be determined to be any timing, but in the present embodiment, is set to be the timing when it is determined that the barcode printer 10 transitions to the sleep mode and the timing when it is detected that the power supply to the barcode printer 10 is stopped. At these timings, the thermal head 11 and the platen roller 17 are in contact with each other for a long time, and thus, it is desirable to keep the thermal head 11 and the platen roller 17 apart.

Similarly, the timing at which the head position control unit 23 determines that the thermal head 11 needs to be headed down may be determined to be any timing, but in the present embodiment, is set to be the timing when it is determined that the barcode printer 10 is released from the sleep mode and the timing when the power supply to the barcode printer 10 is started. Since there is a high possibility that a print instruction is issued at these timings, it is desirable to head down in advance so that printing can be started immediately.

(Hardware Configuration of Head Position Control Unit)

Figure 3:
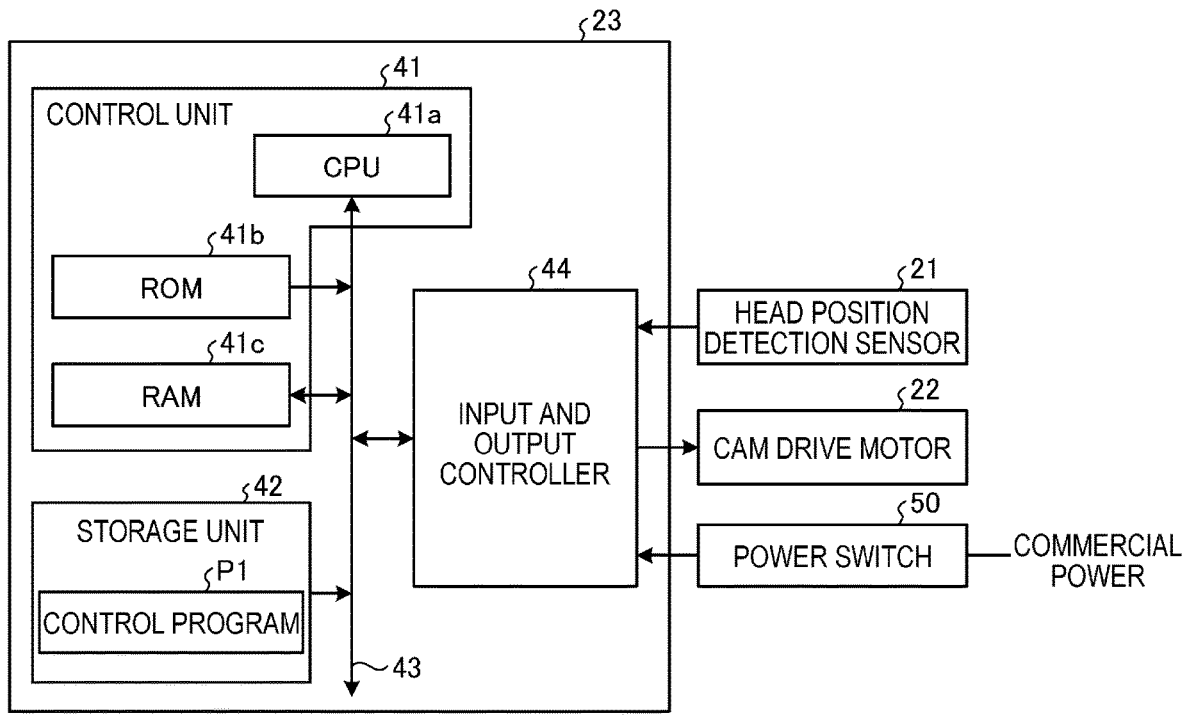
FIG. 3 is a hardware block diagram showing an example of the hardware configuration of a head position control unit.

Next, the hardware configuration of the head position control unit 23 will be described with reference to FIG. 3. FIG. 3 is a hardware block diagram showing an example of the hardware configuration of the head position control unit of the barcode printer of the embodiment.

The head position control unit 23 includes a control unit 41, a storage unit 42, and an input and output controller 44.

The control unit 41 has a general computer configuration including a central processing unit (CPU) 41a, a read only memory (ROM) 41b, and a random access memory (RAM) 41c. The CPU 41a reads out various programs, data files, and the like stored in the ROM 41b and the storage unit 42 described later and loads the programs in the RAM 41c. The CPU 41a operates according to various programs, data files, and the like loaded in the RAM 41c and controls the entire barcode printer 10.

The control unit 41 is connected to the storage unit 42 and the input and output controller 44 via an internal bus 43, respectively.

The storage unit 42 retains the stored information even when the power is turned off. The storage unit 42 is, for example, a hard disk drive (HDD). Further, instead of the HDD, a non-volatile memory such as a flash memory may be provided. The storage unit 42 stores a program or the like including a control program P1. The control program P1 is a program for exerting the functions provided in the barcode printer 10.

The control program P1 may be provided by being incorporated in the ROM 41b in advance. The control program P1 may be configured to be recorded and provided as a file in a format that can be installed or executed in the control unit 41, on a computer-readable recording medium, such as a CD-ROM, a flexible disk (FD), a CD-R, or a digital versatile disc (DVD). Further, the control program. P1 may be configured to be stored on a computer connected to a network such as the Internet and provided by downloading via the network. Further, the control program. P1 may be configured to be provided or distributed via a network such as the Internet.

The input and output controller 44 connects the control unit 41, the head position detection sensor 21, the cam drive motor 22, and a power switch 50.

The head position detection sensor 21 is a sensor that detects the rotation angle of the cam 20. The head position detection sensor 21 detects the position of the thermal head 11 uniquely associated with the rotation angle of the cam 20 by detecting the rotation angle of the cam 20. The head position detection sensor 21 is, for example, an optical encoder that detects the number of passages of irregularities formed along the Y axis over the entire circumference of the cam 20 if the cam 20 rotates. More specifically, the head position detection sensor 21 includes a light source such as an LED and a light receiving element that detects the light emitted from the light source and detects the number of times that the light emitted from the light source is blocked by the convex portion around the cam 20, thereby detecting the rotation angle of the cam 20.

The cam drive motor 22 is a motor that rotationally drives the cam 20. The cam drive motor 22 is, for example, a stepping motor.

The power switch 50 is a switch that supplies commercial power to the barcode printer 10. The power switch 50 instructs the barcode printer 10 to turn on and off the power. The power supply to the barcode printer 10 does not stop immediately when the power switch 50 instructs the power to be turned off. That is, the barcode printer 10 executes post-processing such as saving the setting state and saving the operation log after the instruction to turn off the power is given. Then, after this post-processing is completed, the power supply to the barcode printer 10 is stopped. The head-up operation is also performed as part of this post-processing.

Further, as will be described in detail later, the barcode printer 10 has a function of transitioning to a state in which the power consumption of the barcode printer 10 is suppressed, that is, a so-called sleep mode, without operating the power switch 50 if printing is not performed for a predetermined time. When transitioning to the sleep mode, preparatory processing such as saving the setting state and saving the operation log is performed. The head-up operation is also performed as part of this preparatory processing.

(Functional Configuration of Head Position Control Unit)

Figure 4:
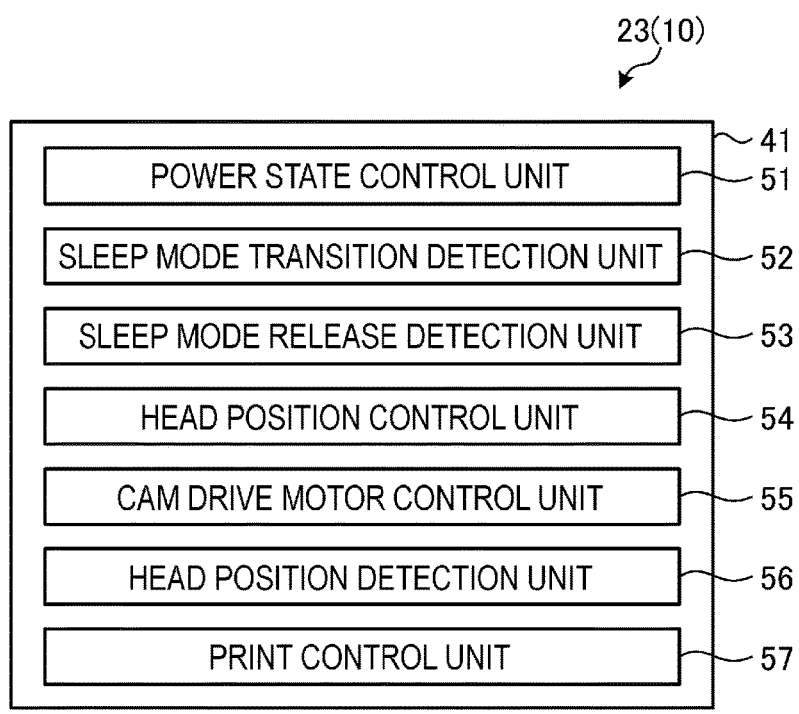
FIG. 4 is a functional block diagram showing an example of the functional configuration of the head position control unit.

Next, the functional configuration of the head position control unit 23 will be described with reference to FIG. 4. FIG. 4 is a functional block diagram showing an example of the functional configuration of the head position control unit of the barcode printer of the embodiment.

The control unit 41 of the head position control unit 23 loads the control program P1 into the RAM 41c and operates the control program P1 to realize a power state control unit 51, a sleep mode transition detection unit 52, a sleep mode release detection unit 53, a head position control unit 54, a cam drive motor control unit 55, a head position detection unit 56, and a print control unit 57 shown in FIG. 4 as functional units.

The power state control unit 51 detects whether the power switch 50 instructed the barcode printer 10 to be turned off or turned on. Further, the power state control unit 51 controls the power state of the barcode printer 10. The power state control unit 51 is an example of a first state transition detection unit and a second state transition detection unit in the present disclosure. The power-off state is an example of a first state in the present disclosure. The power-on state is an example of a second state in the present disclosure.

The sleep mode transition detection unit 52 detects whether the barcode printer 10 was instructed to transition to the sleep mode. Further, the sleep mode transition detection unit 52 transitions the barcode printer 10 to the sleep mode if an instruction to transition to the sleep mode is given. Further, the sleep mode transition detection unit 52 detects that the barcode printer 10 completes the transition to the sleep mode. The sleep mode transition detection unit 52 is an example of the first state transition detection unit in the present disclosure. The sleep mode is an example of the first state in the present disclosure.

The sleep mode release detection unit 53 detects whether the barcode printer 10 was instructed to be released from the sleep mode. Further, the sleep mode release detection unit 53 releases the barcode printer 10 from the sleep mode if an instruction to release the sleep mode is given. The sleep mode release detection unit 53 is an example of the second state transition detection unit in the present disclosure. The state in which the sleep mode is released is an example of the second state in the present disclosure.

The head position control unit 54 pulls the thermal head 11 (print head) away from the platen roller 17 and holds the thermal head 11 (print head) in the state of being pulled away from the platen roller 17, on condition that the sleep mode transition detection unit 52 detects that the barcode printer 10 transitions to the sleep mode. Further, the head position control unit 54 transitions the thermal head 11 to be in contact with the platen roller 17 and holds the state where the thermal head 11 and the platen roller 17 are in contact with each other, on condition that the sleep mode release detection unit 53 detects that the barcode printer 10 is released from the sleep mode.

The cam drive motor control unit 55 rotates the cam 20 that moves the thermal head 11 in the vertical direction. The cam drive motor control unit 55 is an example of the rotation control unit in the present disclosure.

The head position detection unit 56 detects the rotation angle of the cam 20. The head position detection unit 56 is an example of the angle detection unit in the present disclosure.

The print control unit 57 determines whether or not there is a print instruction. Then, if a print instruction is given, the print control unit 57 prints on the label sheet 32 by the thermal head 11.

(Flow of Head-Up Operation)

Figure 5:
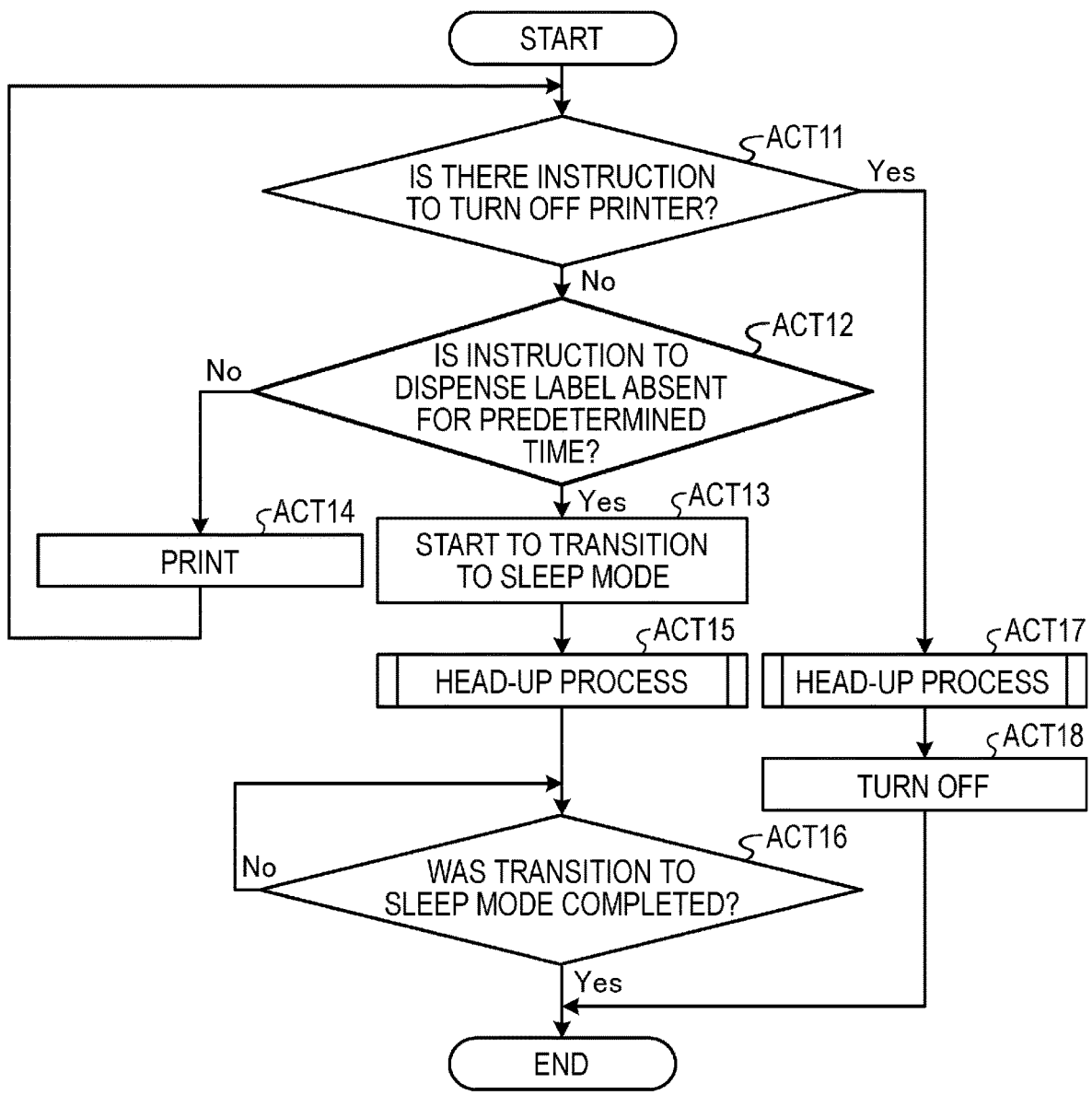
FIG. 5 is a flowchart showing an example of the flow of head-up operation performed by the barcode printer.
Figure 6:
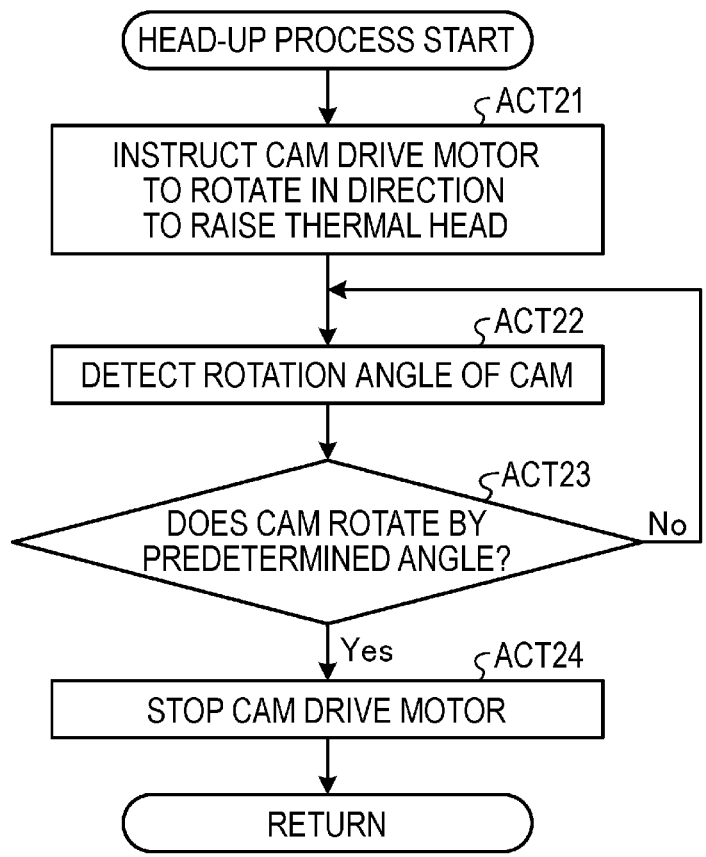
FIG. 6 is a flowchart showing an example of the flow of the head-up process performed by the barcode printer.

Next, the flow of head-up operation performed by the barcode printer 10 will be described with reference to FIGS. 5 and 6. FIG. 5 is a flowchart showing an example of the flow of the head-up operation performed by the barcode printer of the embodiment. FIG. 6 is a flowchart showing an example of the flow of the head-up process performed by the barcode printer of the embodiment.

The power state control unit 51 detects whether there is an instruction to turn off (power-off state) the power of the barcode printer 10 (ACT 11). If it is determined that there is an instruction to turn off the power (ACT 11: Yes), the process proceeds to ACT 16. On the other hand, if it is not determined that there is an instruction to turn off the power (ACT 11: No), the process proceeds to ACT 12.

If it is not determined in ACT 11 that there is an instruction to turn off the power, the sleep mode transition detection unit 52 determines whether or not there is an instruction to dispense a label for a predetermined time (ACT 12). If it is determined that there is no instruction to dispense a label for a predetermined time (ACT 12: Yes), the process proceeds to ACT 13. On the other hand, if it is not determined that there is no instruction to dispense a label for a predetermined time (ACT 12: No), the process proceeds to ACT 14.

If it is determined in ACT 12 that there is no instruction to dispense a label for a predetermined time, the sleep mode transition detection unit 52 causes the barcode printer 10 to start the transition to the sleep mode (ACT 13).

Subsequently, the head position control unit 54 performs a head-up process for separating the thermal head 11 from the platen roller 17 (ACT 15). The details of the head-up process will be described later (see FIG. 6).

The sleep mode transition detection unit 52 determines whether the barcode printer 10 completed the transition to the sleep mode (ACT 16). If it is determined that the transition to the sleep mode is completed (ACT 16: Yes), the barcode printer 10 ends the process of FIG. 5. On the other hand, if it is not determined that the transition to the sleep mode is completed (ACT 16: No), ACT 16 is repeated.

Referring back to ACT 12, if it is not determined in ACT 12 that there is no instruction to dispense a label for a predetermined time, the print control unit 57 prints on the label sheet 32 (ACT 14). Then, the process returns to ACT 11.

Referring back to ACT 11, if it is determined in ACT 11 that there is an instruction to turn off the power, the head position control unit 54 performs a head-up process for separating the thermal head 11 from the platen roller 17 (ACT 17). The details of the head-up process will be described later (see FIG. 6).

The power state control unit 51 ends the supply of electric power to the barcode printer 10 to turn off the power (ACT 18). After that, the barcode printer 10 ends the process of FIG. 5.

Next, the flow of the head-up process performed in ACT 14 or ACT 16 of FIG. 5 will be described with reference to FIG. 6.

The cam drive motor control unit 55 instructs the cam drive motor 22 to rotate in a direction to raise the thermal head 11 (ACT 21).

The head position detection unit 56 detects the rotation angle of the cam 20 (ACT 22).

The head position detection unit 56 determines whether the cam 20 rotated by a predetermined angle after starting rotation (ACT 23). If it is determined that the cam 20 rotated by the predetermined angle (ACT 23: Yes), the process proceeds to ACT 24. On the other hand, if it is not determined that the cam 20 rotated by the predetermined angle (ACT 23: No), the process returns to ACT 22.

In ACT 23, if it is determined that the cam 20 rotated by the predetermined angle, the cam drive motor control unit 55 stops the cam drive motor 22. After that, the process returns to the main routine of FIG. 5.

(Flow of Head-Down Operation)

Figure 7:
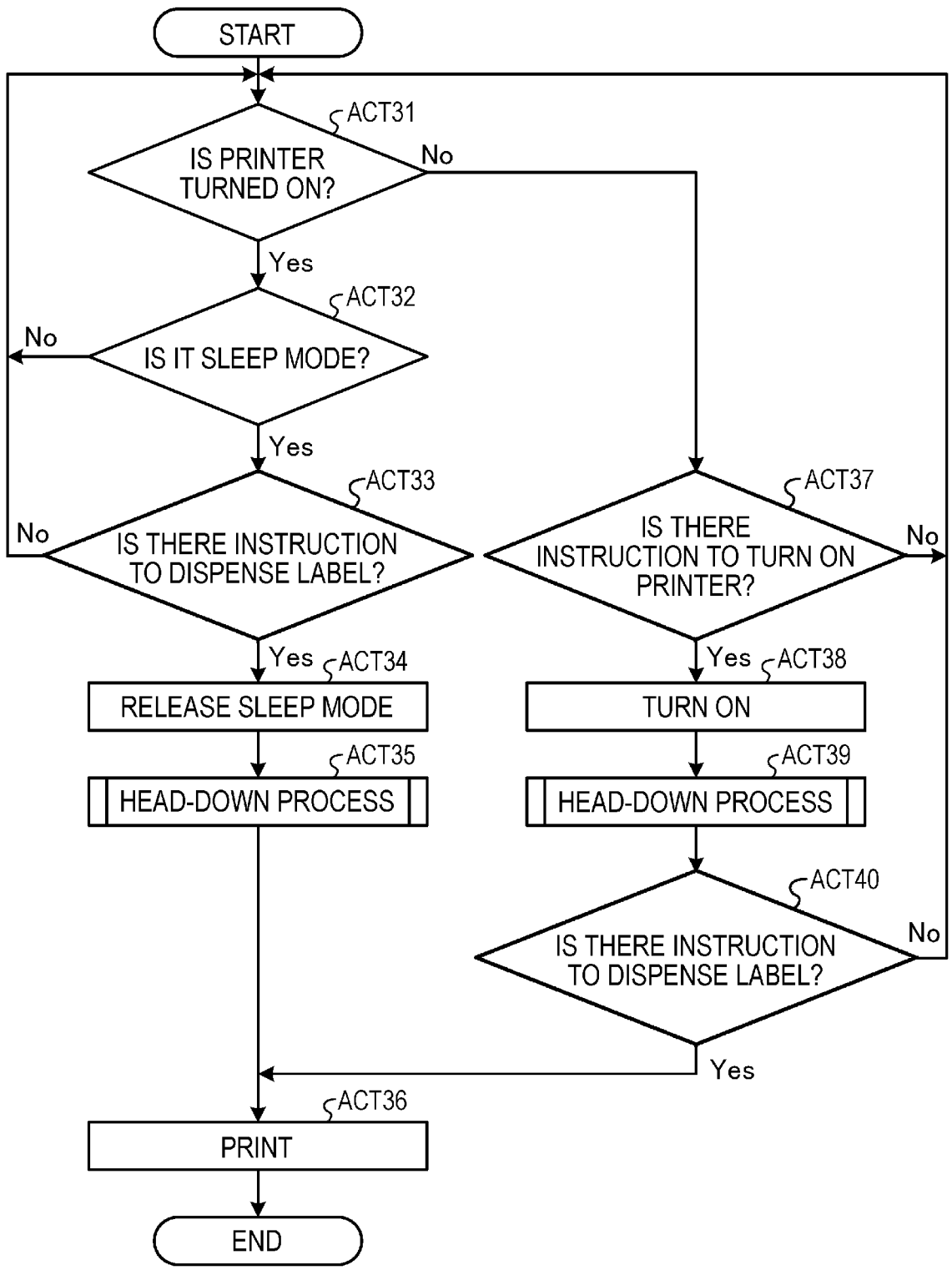
FIG. 7 is a flowchart showing an example of the flow of head-down operation performed by the barcode printer.

Next, the flow of head-down operation performed by the barcode printer 10 will be described with reference to FIGS. 7 and 8. FIG. 7 is a flowchart showing an example of the flow of the head-down operation performed by the barcode printer of the embodiment. FIG. 8 is a flowchart showing an example of the flow of the head-down process performed by the barcode printer of the embodiment.

The power state control unit 51 detects whether the power of the barcode printer 10 is turned on (power-on state) (ACT 31). If it is determined that the power is turned on (ACT 31: Yes), the process proceeds to ACT 32. On the other hand, if it is not determined that the power is turned on (ACT 31: No), the process proceeds to ACT 37.

If it is determined in ACT 31 that the power of the barcode printer 10 is turned on, the sleep mode transition detection unit 52 determines whether the barcode printer 10 is in sleep mode (ACT 32). If it is determined that the barcode printer 10 is in sleep mode (ACT 32: Yes), the process proceeds to ACT 33. On the other hand, if it is not determined that the barcode printer 10 is in sleep mode (ACT 32: No), the process returns to ACT 31.

If it is determined in ACT 32 that the barcode printer 10 is in sleep mode, the print control unit 57 determines whether or not there is a label dispense instruction (ACT 33). If it is determined that there is a label dispense instruction (ACT 33: Yes), the process proceeds to ACT 34. On the other hand, if it is not determined that there is a label dispense instruction (ACT 33: No), the process returns to ACT 31.

If it is determined in ACT 33 that there is a label dispense instruction, the sleep mode release detection unit 53 releases the sleep mode (ACT 34).

Subsequently, the head position control unit 54 performs a head-down process of bringing the thermal head 11 and the platen roller 17 into contact with each other (ACT 35). The details of the head-down process will be described later (see FIG. 8).

Next, the print control unit 57 prints on the label sheet 32 (ACT 36), and then the barcode printer 10 ends the process of FIG. 7.

Referring back to ACT 31, if it is not determined in ACT 31 that the power of the barcode printer 10 is turned on, the power state control unit 51 detects whether there is an instruction to turn on the power of the barcode printer 10 (power-on state) (ACT 37). If it is determined that there is an instruction to turn on the power (ACT 37: Yes), the process proceeds to ACT 38. On the other hand, if it is not determined that there is an instruction to turn on the power (ACT 37: No), the process returns to ACT 31.

If it is determined in ACT 37 that there is an instruction to turn on the power of the barcode printer 10, the power state control unit 51 starts supplying electric power to the barcode printer 10 to turn on the power (ACT 38).

Subsequently, the head position control unit 54 performs a head-down process of bringing the thermal head 11 and the platen roller 17 into contact with each other (ACT 39). The details of the head-down process will be described later (see FIG. 8).

The print control unit 57 determines whether there is a label dispense instruction (ACT 40). If it is determined that there is a label dispense instruction (ACT 40: Yes), the process proceeds to ACT 36. On the other hand, if it is not determined that there is a label dispense instruction (ACT 40: No), the process returns to ACT 31.

Next, the flow of the head-down process performed in ACT 35 of FIG. 7 will be described with reference to FIG. 8.

The cam drive motor control unit 55 instructs the cam drive motor 22 to rotate in the direction to lower the thermal head 11 (ACT 41).

The head position detection unit 56 detects the rotation angle of the cam 20 (ACT 42).

The head position detection unit 56 determines whether the cam 20 rotated by a predetermined angle after starting rotation (ACT 43). If it is determined that the cam 20 rotated by the predetermined angle (ACT 43: Yes), the process proceeds to ACT 44. On the other hand, if it is not determined that the cam 20 rotated by the predetermined angle (ACT 43: No), the process returns to ACT 42.

In ACT 43, if it is determined that the cam 20 rotated by the predetermined angle, the cam drive motor control unit 55 stops the cam drive motor 22. After that, the process returns to the main routine of FIG. 7.

As described above, in the barcode printer 10 (printer device) of the embodiment, if the sleep mode transition detection unit 52 (first state transition detection unit) detects that the barcode printer 10 transitions to the sleep mode (first state) or if the power state control unit 51 detects the instruction to turn off the barcode printer 10, the head position control unit 54 pulls the thermal head 11 (print head) away from the platen roller 17 and holds the thermal head 11 in the state of being pulled away from the platen roller 17. Therefore, the head-up operation can be reliably performed without performing a special operation for instructing the movement of the thermal head 11.

Further, in the barcode printer 10 (printer device) of the embodiment, the first state includes a state where the barcode printer 10 transitioned to the sleep mode or a state where the power supply to the barcode printer 10 was stopped. Therefore, it is possible to prevent the thermal head 11 and the platen roller 17 from being in contact with each other for a long time.

Further, in the barcode printer 10 (printer device) of the embodiment, if the sleep mode release detection unit 53 (second state transition detection unit) detects that the barcode printer 10 transitions to the sleep mode release state (second state), or if the power state control unit 51 detects an instruction to turn on the power of the barcode printer 10, the head position control unit 54 transitions the thermal head 11 (print head) to be in contact with the platen roller 17 and holds the thermal head 11 in the state of being in contact with the platen roller 17. Therefore, the head-down operation can be reliably performed without performing a special operation for instructing the movement of the thermal head 11.

Further, in the barcode printer 10 (printer device) of the embodiment, the second state includes a state where the sleep mode of the barcode printer 10 was released and a state where the power supply to the barcode printer 10 was started. Therefore, if the barcode printer 10 is made to print, the head-up state can be immediately released.

Further, in the barcode printer 10 (printer device) of the embodiment, the cam drive motor control unit 55 (rotation control unit) rotates the cam 20 that moves the thermal head 11 (print head) in the vertical direction until the rotation angle of the cam 20 detected by the head position detection unit 56 (angle detection unit) reaches a predetermined value. Therefore, the thermal head 11 can be reliably headed up or down regardless of the initial position where the cam 20 starts rotating.

In the present embodiment, the example in which the thermal head 11 is moved up and down by rotating the cam 20 has been described, but the thermal head 11 may be moved up and down by a unit other than the cam 20. For example, the head block 13 raised by using a latching solenoid may be held by the magnetic force of a permanent magnet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer device, comprising:
    a print head;
    a platen roller;
    a first state transition detector configured to detect that the printer device transitions to a first state;
    a second state transition detector configured to detect that the printer device transitions from the first state to a second state; and
    a head position controller configured to pull the print head away from the platen roller and hold a separated state where the print head is pulled away from the platen roller on condition that the first state transition detector detects the transition to the first state, wherein
    the head position controller causes the print head to transition to an engaged state of being in contact with the platen roller and holds the engaged state where the print head is in contact with the platen roller on condition that the second state transition detector detects the transition from the first state to the second state.

2. The printer device according to claim 1, wherein the first state comprises a sleep state where the printer device transitions to a sleep mode or a powerless state where a power supply to the printer device is terminated.

3. The printer device according to claim 1, wherein the second state comprises a released state where the printer device is released from the sleep mode and a powered state where the power supply to the printer device is started.

4. The printer device according to claim 1, wherein the head position controller comprises
    a rotation controller configured to rotate a cam that moves the print head in a vertical direction, and
    an angle detector configured to detect a rotation angle of the cam, and
    the head position controller moves the cam until the rotation angle of the cam detected by the angle detector reaches a predetermined value.

5. The printer device according to claim 1, wherein the print head is a thermal print head and the printer device is a thermal printer.

6. A method for operating a printer device, comprising:
    detecting that a printer device transitions to a first state by a first state transition detector;
    pulling a print head away from a platen roller by a head position controller;
    holding a separated state where the print head is pulled away from the platen roller on condition that the printer device transitions to the first state is detected by the head position controller;

detecting that the printer devices transitions from the first state to a second state by a second state transition detector;

causing the print head to transition to an engaged state of being in contact with the platen roller by the head position controller; and holding the engaged state where the print head is in contact with the platen roller on condition that the printer device transitions from the first state to a second state is detected by the head position controller.

7. The method according to claim 6, wherein
the first state comprises a sleep state where the printer device transitions to a sleep mode or a powerless state where a power supply to the printer device is terminated.

8. The method according to claim 6, wherein
the second state comprises a released state where the printer device is released from the sleep mode and a powered state where a power supply to the printer device is started.

9. The method according to claim 6, further comprising:
rotating a cam that moves the print head in a vertical direction;
detecting a rotation angle of the cam; and
moving the cam until the rotation angle of the cam detected reaches a predetermined value.

10. A barcode printer, comprising:
a thermal print head;
a platen roller;
a first state transition detector configured to detect that the printer device transitions to a first state;
a second state transition detector configured to detect that the printer device transitions from the first state to a second state; and
a head position controller configured to pull the thermal print head away from the platen roller and hold a separated state where the print head is pulled away from the platen roller on condition that the first state transition detector detects the transition to the first state, wherein the head position controller causes the print head to transition to an engaged state of being in contact with the platen roller and holds the engaged state where the print head is in contact with the platen roller on condition that the second state transition detector detects the transition from the first state to the second state.

11. The barcode printer according to claim 10, wherein
the first state comprises a sleep state where the printer device transitions to a sleep mode or a powerless state where a power supply to the printer device is terminated.

12. The barcode printer according to claim 10, wherein
the second state comprises a released state where the printer device is released from the sleep mode and a powered state where the power supply to the printer device is started.

13. The barcode printer according to claim 10, wherein
the head position controller comprises
a rotation controller configured to rotate a cam that moves the print head in a vertical direction, and
an angle detector configured to detect a rotation angle of the cam, and
the head position controller moves the cam until the rotation angle of the cam detected by the angle detector reaches a predetermined value.

* * * * *